Aug. 4, 1959  G. A. LYON  2,898,152
WHEEL COVER
Filed July 1, 1955  2 Sheets-Sheet 2
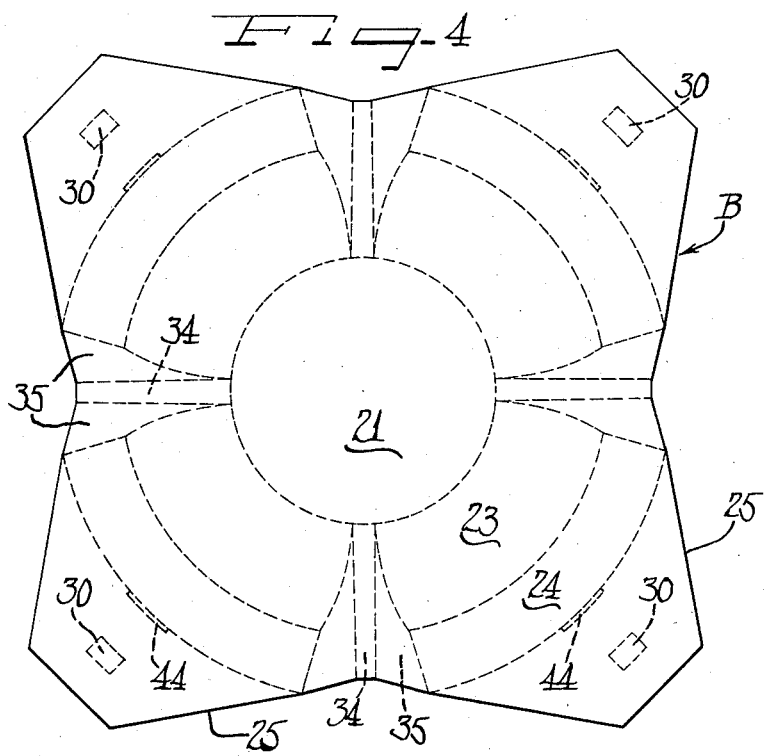
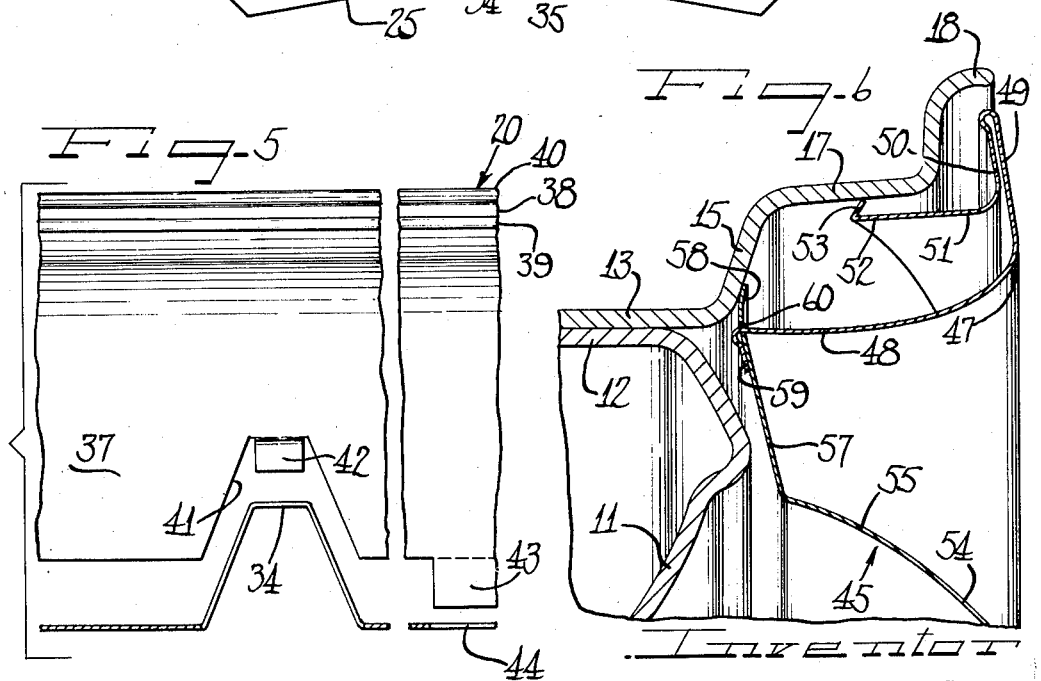
Inventor
George Albert Lyon

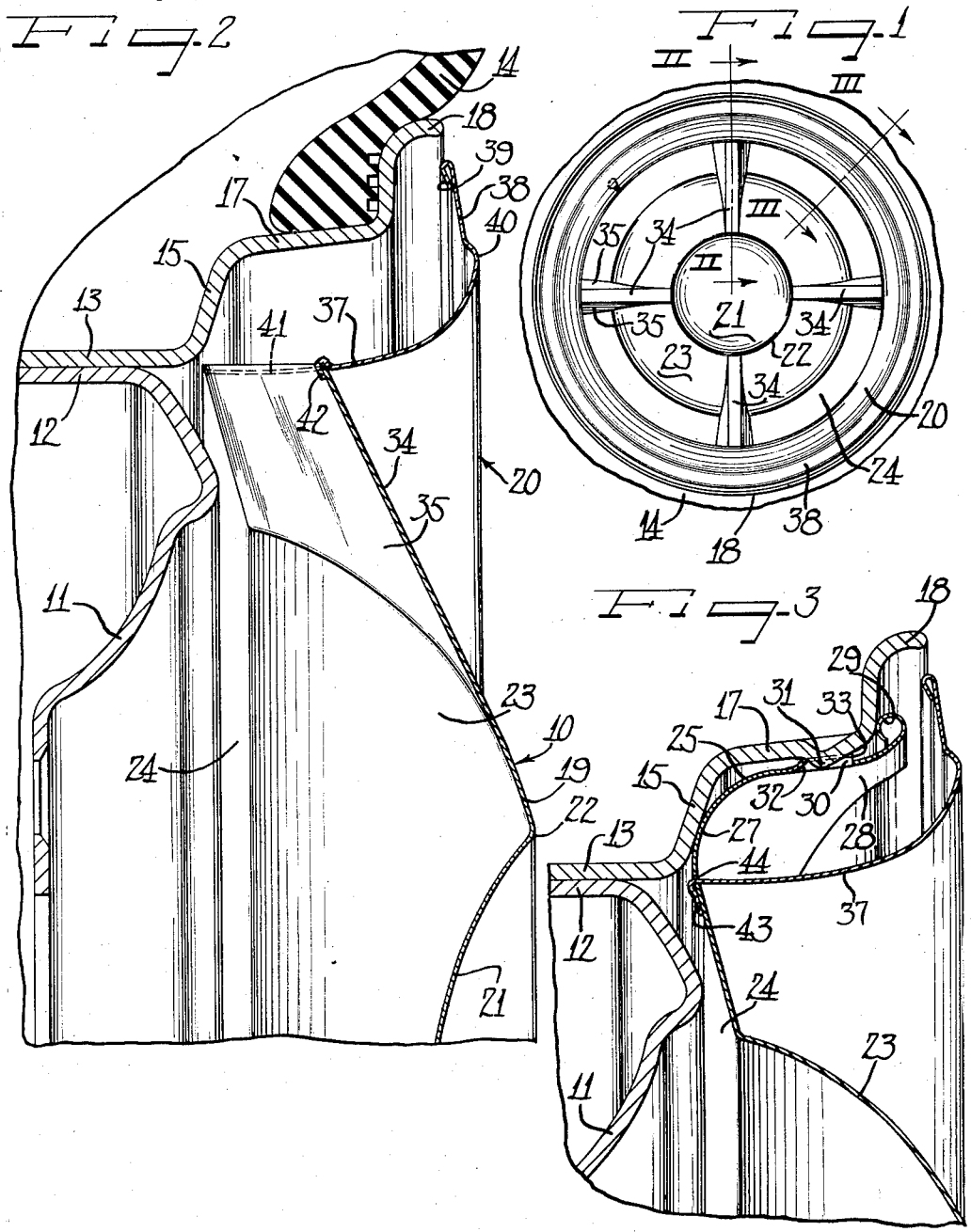

United States Patent Office 2,898,152
Patented Aug. 4, 1959

2,898,152

WHEEL COVER

George Albert Lyon, Detroit, Mich.

Application July 1, 1955, Serial No. 519,342

13 Claims. (Cl. 301—37)

The present invention relates to improvements in wheel structures and more particularly concerns the ornamental and protective covering of the outer sides of vehicle wheels.

An important object of the present invention is to provide an improved wheel structure having novel cover means for the outer side thereof.

Another object of the invention is to provide an improved wheel cover for disposition at the outer side of a vehicle wheel.

A further object of the invention is to provide a novel composite cover structure affording ornamental and reinforcing features of a character that prohibit practical drawing of the cover from a single piece of sheet material, but in the finished cover afford the appearance of having been made from a single sheet metal blank.

Still another object of the invention is to provide a novel cover construction having a deeply drawn appearance and having a novel relationship of ornamental and reinforcing spoke-like ribs in the portion thereof appearing as deeply drawn.

It is a further object of the invention to provide a cover for disposition at the outer side of a vehicle wheel and comprising a permanent assembly of cover components that may be made respectively by die stamping or drawing and by rolling methods of manufacture and which are adapted for easy and convenient assembly, for low cost mass production of the covers.

Other objects, features and advantages of the present invention will be readily apparent from the following detailed description of certain preferred embodiments thereof taken in conjunction with the accompanying drawings, in which:

Figure 1 is an outer side elevational view of a wheel structure embodying features of the invention.

Figure 2 is an enlarged fragmentary radial sectional view taken substantially on the line II—II of Fig. 1.

Figure 3 is an enlarged fragmentary radial sectional view taken substantially on the line III—III of Fig. 1.

Figure 4 is a developed plan view of a trimmed blank for making the central cover member.

Figure 5 is a more or less schematic assembly view showing how the cover components are constructed and arranged for assembly with one another; and Figure 6 is a fragmentary radial sectional view similar to Fig. 3 but showing a modification in the cover.

A wheel cover 10 (Figs. 1, 2 and 3) embodying features of the invention is adapted to be applied to the outer side of a vehicle wheel including a disk spider wheel body 11 provided with an axially extending outer marginal attachment flange 12 secured in suitable fashion to a base flange 13 of a tire rim of the multi-flange, drop center type adapted to support a pneumatic tire 14 which may be of the tubeless type currently popular or may be of the tire and tube combination. From the outer side of the base flange 13 extends generally radially outwardly a side flange 15 which joins an intermediate generally radially outwardly sloping and axially outwardly extending flange 17 merging with a terminal flange 18 that extends generally radially outwardly and then is turned axially outwardly.

According to the present invention, the cover 10 comprises an inner cover plate 19 of a diameter to overlie the wheel body 11, and an outer annular tire rim covering ring cover member 20 attached thereto. Both of the cover members or components 19 and 20 are adapted to be made from suitable sheet material such as stainless steel, brass, suitable aluminum alloy, and the like, adapted to be conveniently shaped and finished.

By preference, the inner cover member or component 19 is formed up as a stamping drawn in suitable die equipment. To this end, the inner cover member 19 is provided with a central axially outwardly projecting crown formation of substantial height which may be centrally concavely shaped as at 21 if desired. This provides a reinforcing annular rib 22 at the axially outermost ridge portion. From the reinforcing ridge or rib 22 the crown portion of the cover slopes generally radially outwardly and axially inwardly, preferably convexly in the present instance to provide a crown side wall 23 leading into an annular fairly deeply inset generally radially outwardly and axially inwardly sloping oblique or frusto-conical marginal portion 24 that overlies the outer marginal portion of the wheel body 11.

For retaining the cover 10 on the outer side of the wheel, means are provided for retaining engagement with the tire rim. In a suitable form, such retaining means includes a series such as four, although three or five may be used, retaining finger extensions 25 from the margin of the cover member 19 and more particularly from the annular marginal cover portion 24 (Fig. 3). Each of the retaining fingers 25 is of substantial width at juncture with the annular cover portion 24 and extends generally radially outwardly and is then turned generally axially outwardly to provide a shoulder 27 that bottoms against the side flange 15, and a radially resiliently deflectable axially outwardly extending retaining finger leg 28 adapted in assembly to lie adjacent the radially inner face of the intermediate flange 17.

At its outer extremity the retaining finger is provided with an underturned reinforcing terminal bead 29. Intermediate its ends the retaining finger has an opening 30 within which is accommodated a retaining bump 31 pressed inwardly in the axially outer portion of the intermediate flange 17. The opening 30 is defined by a generally radially outwardly turned retaining flange 32 at its axially inner side for retaining gripping engagement in inwardly camming relation with the axially inner shoulder provided by the retaining bump 31. Turning of the cover on the wheel is prevented by side flanges 33 at the sides of the opening 30 directed generally radially outwardly similarly as the retaining flange 32 for engagement with the respective opposite sides of the retaining bump 31.

For assembling the cover with the outer side of the wheel, the retaining fingers 25 are generally aligned with the retaining bumps 31 and the cover pressed axially inwardly to cam the fingers over the retaining bumps and snap the retaining flanges 32 behind the retaining bump shoulders. For removing the cover from the wheel, a pry-off tool such as a screw driver or the like may be applied behind the terminal reinforcing bead 29 of the retaining fingers, or as many of such fingers as necessary to pry the same free from the respective retaining bumps engaged thereby.

For reinforcement and to afford a desirable ornamental appearance, the inner cover member 19 is preferably provided with a plurality of equally spaced generally radially extending spoke-like ribs 34 which may extend more or less tangentially from the peak of the crown of the cover member generally radially outwardly and axially inwardly and have divergently extending side walls 35 which merge conformably with the crown side wall 23 and the marginal portion 24 of the cover member and open radially outwardly toward the tire rim.

In forming the spoke ribs 34 integrally in one piece with the other portions of the cover member 19, a flat sheet metal blank B (Fig. 4) may be utilized which is initially trimmed to provide the desired number of retaining finger extensions 25 radiating therefrom, in the present instance four as shown. In the blank the sides of the retaining fingers 25 substantially converge with the sides of the adjacent finger extensions. In this flat state, the blank B may be polished to a high luster on the outer face thereof. The blank is then adapted to be bent in suitable shaping die mechanism along appropriate lines as indicated in dash line in Fig. 4 to bend in the central crown portion 21, to bend down the crown side wall 23 and the marginal portion 24, and at the same time to fold up the reinforcing and ornamental ribs 34 intermediate the retaining finger extensions 25. At the same time or thereafter the retaining fingers 25 may be shaped by drawing the same into the turned up resiliently deflectable form thereof with the tips thereof turned to provide the terminal beads 29. The openings 30 will be punched in the retaining finger extensions 25 at a suitable time either before or after the fingers are turned up.

It will be appreciated that in making the cover member 19 in the manner described, maximum draw depth can be attained at the outer margin of the cover with minimum stretching or strain upon the metal.

The annular outer cover member or component 20 is constructed and arranged to cooperate with the marginal cover portion 24 and the outer ends of the spoke ribs 34 and to conceal the retaining fingers 25. To this end, the cover member 20 is provided with an inner generally axially inwardly extending body flange portion 37 which is of a diameter preferably slightly less than the diameter described about the outer ends of the spoke ribs 34. At its outer side the flange body 37 merges with a generally radially outwardly and preferably slightly axially inwardly directed outer marginal annular flange portion 38 which extends into overlying relation to the outer side of the tire rim and more particularly the terminal flange 18 and has an underturned reinforcing and finishing bead-like flange 39 that is preferably spaced both radially inwardly and axially outwardly from the terminal flange so as to provide a substantial chamber therebehind for accommodating wheel balancing weights or the like and also to overlie the terminal portions 29 of the retaining fingers 25. An annular reinforcing rib 40 may be provided in the cover member 20 adjacent to juncture of the flange portions 37 and 38 thereof.

To accommodate the outer end portions of the rib spokes 34, the inner margin of the inner body flange portion 37 of the cover member 20 is appropriately notched out as at 41 (Fig. 5) complementary to the transverse sectional contour of the spoke rib so as to nest thereover with the inner edge of the flange 37 bearing against the outer marginal extremity of the cover portion 24. This affords the appearance from the outer side of the cover as though the cover members 19 and 20 were all derived from a single stamping. It will be appreciated, of course, that the ring member 20 may be made as a rolled section if desired, or it may be drawn as preferred.

For securing the cover members 19 and 20 in assembly, means are provided such as tabs 42 from the upper or inner ends of the notches 41 bent as best seen in Fig. 2 about and under the outer end portions of the crown or crests of the respective spoke ribs 34. In addition, retaining tab extensions 43 may be provided on the portions of the ring cover member 20 intermediate the notches 41 and projecting from the inner edge of the flange body 37 to extend through appropriate slots 44 formed at juncture of the cover portion 24 with the retaining fingers 25 and bent over or clenched against the back of the cover portion 24, substantially as shown in Fig. 3.

In a modification of the cover, as shown in Fig. 6, a cover assembly 45 is provided which is adapted to be disposed at the outer side of a vehicle wheel which in essential respects corresponds to the wheel shown in Fig. 2 and therefore the corresponding parts thereof are identified by the same numbers. In the cover 45, however, instead of a central cover member having means for attaching the cover to a wheel, a circular outer ring cover member 47 is provided that has means for securing the cover to the wheel. To this end, the ring cover member 47 includes an inner generally axially inwardly extending body flange 48 that merges with a generally radially and outwardly extending and axially inwardly sloping outer marginal annular flange portion 49 for overlying the tire rim.

For securing the cover to the outer side of the wheel, the outer marginal portion 49 of the outer cover member 47 has an underturned generally radially inwardly extending flange 50 provided with a generally axially inwardly extending annular continuous flange portion 51 provided with axially inward radially resiliently deflectable retaining finger extensions 52 having radially and axially outwardly angled short and stiff finger terminals 53 retainingly engageable in gripping relation against the inner side of the intermediate flange 17 of the tire rim. The construction and operation of retaining finger structure of this kind is covered in my Patent No. 2,624,634, issued Jan. 6, 1953.

At its axially inner portion the annular cover body flange 48 is secured to an inner cover member 54 having a crown side wall 55 and an inset cover portion 57 substantially the same as the cover member 19 of the cover 10 and provided with rib spoke elements similarly as the cover member 19, if desired. At its radially outer extremity, the outer marginal cover portion 57 is provided with a slightly outturned terminal margin 58 of a diameter to lie in assembly against the outer side of the radially inner portion of the side flange 15 of the tire rim.

Attachment of the cover member 47 to the cover member 54 is effected by means of tab extensions 59 from the inner edge of the cover member body 48 extending through suitable slots 60 in the outer marginal portion of the cover portion 57 and clenched into retaining engagement therebehind.

The construction and relationship of the cover members 54 and 47 is such that when the cover 45 is in assembly on the outer side of the wheel, with the marginal extremity 58 bottoming against the side flange 15, the outer marginal portion 49 and the underturned flange 50 of the outer cover member 47 will be held in spaced relation to the terminal flange 18 of the tire rim, substantially as shown so as to provide a chamber therebehind for reception of balancing weights and the like. Moreover, for removing the cover from the wheel, the turned outer edge extremity at juncture of the cover flange portions 49 and 50 may be engaged by a pry-off tool inserted therebehind for effecting pry-off leverage against the cover to disengage the retaining fingers 52 from the intermediate flange 17.

It will be understood that modifications and variations may be effected without departing from the scope of the novel concepts of the present invention.

I claim as my invention:

1. In a wheel structure including a wheel body and a tire rim, a cover for disposition at the outer side of the wheel including a central circular member and a radially outer circular member, one of said members having means for attaching the cover to the wheel, the central member having a plurality of generally radially extending spoke portions thereon, and the outer of said members being attached at its radially inner side to the radially outer portion of said central member adjacent the radially outer ends of the spoke portions.

2. In a wheel structure including a wheel body and a tire rim, a cover for disposition at the outer side of the wheel including a central circular member and a radially outer circular member, one of said members having means for attaching the cover to the wheel, the central member having a plurality of generally radially extending spoke portions thereon, and the outer of said members being attached to said central member adjacent the radially outer ends of the spoke portions, said spoke portions being pressed up in said central cover member and the outer cover member being notched out to engage over the outer end portions of the spoke portions.

3. In a wheel structure including a wheel body and a tire rim, a cover for disposition at the outer side of the wheel including a radially inner circular member and a radially outer circular member, one of said members having means for attaching the cover to the wheel, the inner member having a plurality of generally radially extending spoke portions thereon, and the outer of said members being attached to said inner member adjacent the radially outer ends of the spoke portions, said spoke portions being pressed up in said inner cover member and the outer cover member being notched out to engage over the outer end portions of the spoke portions, said outer cover member having attaching tabs engaging with the outer ends of the spoke portions.

4. In a wheel structure including a wheel body and a tire rim, a cover for disposition at the outer side of the wheel including a radially inner circular member and a radially outer circular member, one of said members having means for attaching the cover to the wheel, the inner member having a plurality of generally radially extending spoke portions thereon, and the outer of said members being attached to said inner member adjacent the radially outer ends of the spoke portions, said spoke portions being pressed up in said inner cover member and the outer cover member being notched out to engage over the outer end portions of the spoke portions, said outer cover member having attaching tabs engaging with the outer ends of the spoke portions, said outer cover member having additional tabs interengaging with the inner cover member intermediate said spoke portions.

5. In a wheel structure including a wheel body and a tire rim, a cover for disposition at the outer side of the wheel including a radially inner circular member and a radially outer circular member, one of said members having means for attaching the cover to the wheel, the inner member having a plurality of generally radially extending spoke portions thereon, and the outer of said members being attached at its radially inner side to the radially outer portion of said inner member adjacent the radially outer ends of the spoke portions, said outer cover member having tabs thereon interengaging with said radially outer portion of the inner cover member.

6. In a wheel structure including a wheel body and a tire rim, a cover for disposition at the outer side of the wheel including a radially inner circular member and a radially outer circular member, said inner cover member having a plurality of retaining finger extensions therefrom interengageable with retaining means on the tire rim for holding the cover on the wheel, the inner member having a plurality of generally radially extending spoke portions thereon, and the outer of said members being attached to said inner member adjacent the radially outer ends of the spoke portions.

7. In a wheel structure including a wheel body and a tire rim, a cover for disposition at the outer side of the wheel including a generally circular inner cover member and a generally circular outer cover member, said inner cover member comprising a plate for concealingly overlying the wheel body and the outer cover member comprising a ring member for substantially concealingly overlying the tire rim, said inner cover member having marginal extension structure engageable with the tire rim for supporting the cover in spaced relation to the wheel body, and the outer cover member concealingly overlying said extension structure and having on the inner edge portion thereof retaining tabs connected to the inner cover member.

8. In a wheel structure including a wheel body and a tire rim, a cover for disposition at the outer side of the wheel including a generally circular inner cover member and a generally circular outer cover member, said inner cover member comprising a plate for concealingly overlying the wheel body and the outer cover member comprising a ring member for substantially concealingly overlying the tire rim, said inner cover member having marginal extension structure engageable with the tire rim for supporting the cover in spaced relation to the wheel body, and the outer cover member concealingly overlying said extension structure and having the inner edge portion thereof connected to the inner cover member, said extension structure including a marginal portion turned relative to the immediately adjacent portion of the inner cover member and bottoming against a generally axially outwardly facing flange of the tire rim, and said outer cover member having retaining extension means thereon retainingly engageable with the tire rim in press-on, pry-off relation.

9. In a wheel cover for disposition at the outer side of a vehicle wheel, an inner sheet metal cover member having pressed up therefrom a plurality of radially outwardly extending spoke ribs that open radially outwardly, and a circular radially outer cover member having an inner marginal portion engageable over said ribs and against the cover member intermediate the ribs and attached thereto.

10. In a wheel cover for disposition at the outer side of a vehicle wheel, an inner sheet metal cover member having pressed up therefrom a plurality of radially outwardly extending spoke ribs that open radially outwardly, and a circular radially outer cover member having an inner marginal portion engageable over said ribs and against the cover member intermediate the ribs and attached thereto, said outer cover member inner margin having tabs thereon interengageable with the margin of the inner cover member.

11. In a cover for disposition at the outer side of a vehicle wheel, sheet metal radially inner and radially outer cover members, the radially inner of said cover members having a circular axially outwardly projecting portion and a marginal portion surrounding said circular portion and provided with a plurality of generally radially extending ribs projecting axially outwardly and extending generally radially and inset intermediate marginal portions, and said radially outer cover portion overlying the ribs and intermediate marginal portions of the inner cover member spaced from said axially outwardly projecting circular portion and appearing from the outer side of the cover as though comprising a portion of the inner cover member, and means securing the cover members together.

12. In a cover for disposition at the outer side of a vehicle wheel, sheet metal radially inner and radially outer cover members, the radially inner of said cover members having a circular axially outwardly projecting portion and a marginal portion surrounding said circular portion and provided with a plurality of generally radially extending ribs projecting axially outwardly and extending generally radially and inset intermediate marginal portions, and said radially outer cover portion overlying the ribs and intermediate marginal portions of the inner cover member spaced from said axially outwardly projecting circular portion and appearing from the outer side of the cover as though comprising a portion of the inner cover member, and means securing the cover members together, said inner cover member having retaining extension means from the margin thereof concealed behind said outer cover member.

13. In a cover for disposition at the outer side of a vehicle wheel, sheet metal radially inner and radially outer cover members, the radially inner of said cover members having a circular axially outwardly projecting portion and a marginal portion surrounding said circular portion and provided with a plurality of generally radially extending ribs projecting axially outwardly and extending generally radially and inset intermediate marginal portions, and said radially outer cover portion overlying the ribs and intermediate marginal portions of the inner cover member spaced from said axially outwardly projecting circular portion and appearing from the outer side of the cover as though comprising a portion of the inner cover member, and means securing the cover members together, said outer cover member having concealed therebehind means for retaining the cover on the wheel.

References Cited in the file of this patent

UNITED STATES PATENTS

| | | |
|---|---|---|
| D. 166,863 | McLeod | May 27, 1952 |
| 1,985,908 | Zerk | Jan. 1, 1935 |
| 2,045,902 | Eksergian | Jan. 30, 1936 |
| 2,444,052 | Lyon | June 29, 1948 |
| 2,490,822 | Lyon | Dec. 13, 1949 |
| 2,600,411 | Lyon | June 17, 1952 |
| 2,600,412 | Lyon | June 17, 1952 |
| 2,709,114 | Plotkin | May 24, 1955 |